(12) United States Patent
Kim et al.

(10) Patent No.: US 6,188,657 B1
(45) Date of Patent: Feb. 13, 2001

(54) METHOD AND APPARATUS FOR TESTING QUALITY OF AN OPTICAL DISK MEDIUM

(75) Inventors: Dae-Young Kim, Seoul; Woon-Seong Yeo, Chungcheongbuk-Do; Dong-Seok Bae, Kyunggi-Do; Hyung-Kyu Kim, Chungcheongbuk-Do, all of (KR)

(73) Assignee: LG Electronics, Inc., Seoul (KR)

( * ) Notice: Under 35 U.S.C. 154(b), the term of this patent shall be extended for 0 days.

(21) Appl. No.: 09/018,569

(22) Filed: Feb. 4, 1998

(30) Foreign Application Priority Data

Sep. 24, 1997 (KR) .............................. 48543/1997

(51) Int. Cl.$^7$ ....................................... G11B 7/00
(52) U.S. Cl. ............... 369/54; 369/44.29; 369/48
(58) Field of Search ............... 369/44.29, 44.27, 369/44.28, 44.32, 44.13, 42, 48, 54, 58, 275.1, 275.4, 275.3, 276

(56) References Cited

U.S. PATENT DOCUMENTS

| 5,119,359 | * | 6/1992 | Miyagi et al. ............... 369/275.3 X |
| 5,256,965 |   | 10/1993 | Nomura . |
| 5,530,687 |   | 6/1996 | Yamaguchi . |

* cited by examiner

Primary Examiner—Muhammad Edun

(57) ABSTRACT

The method and apparatus for testing quality of an optical disk medium reproduce an auxiliary signal from an optical disk wherein the auxiliary signal corresponds to a preformatted structure of the optical disk. The quality of the optical disk is then determined based on the auxiliary signal.

44 Claims, 12 Drawing Sheets

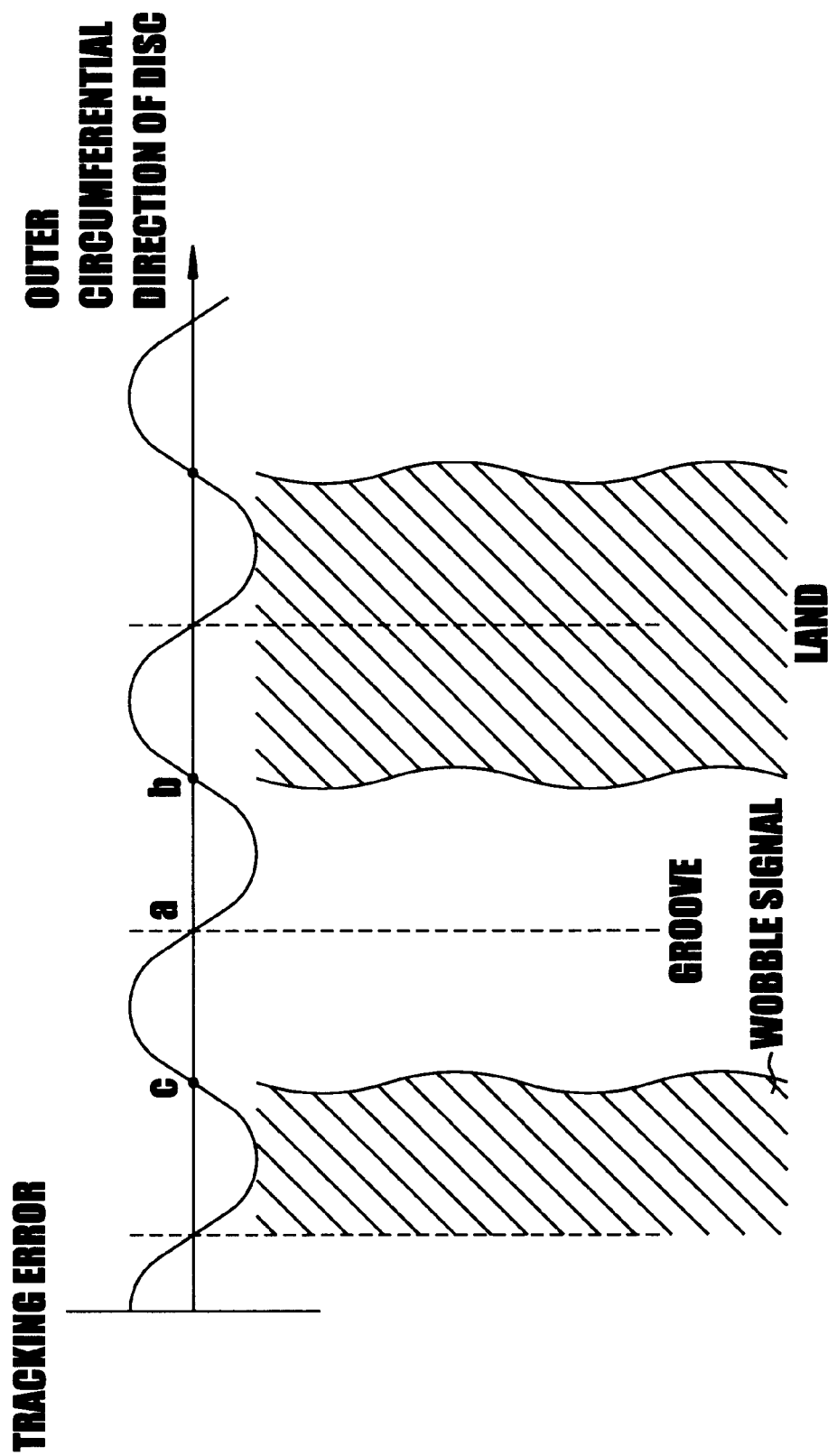

1 SPIRAL TRACK

2 SPIRAL TRACK

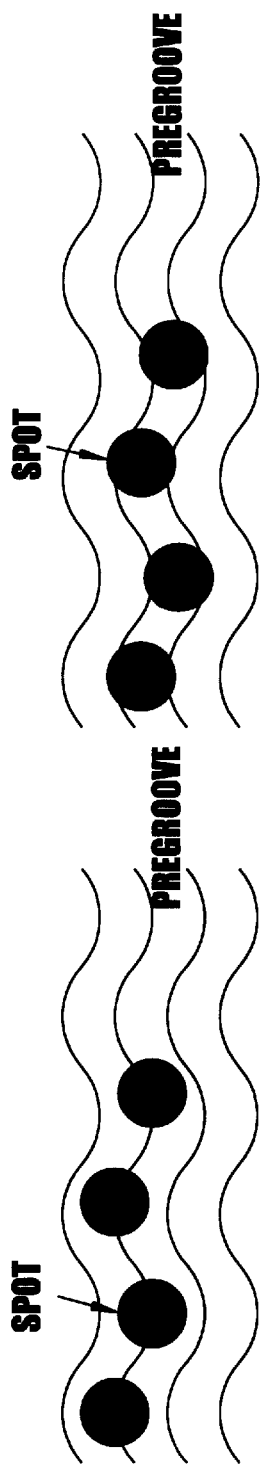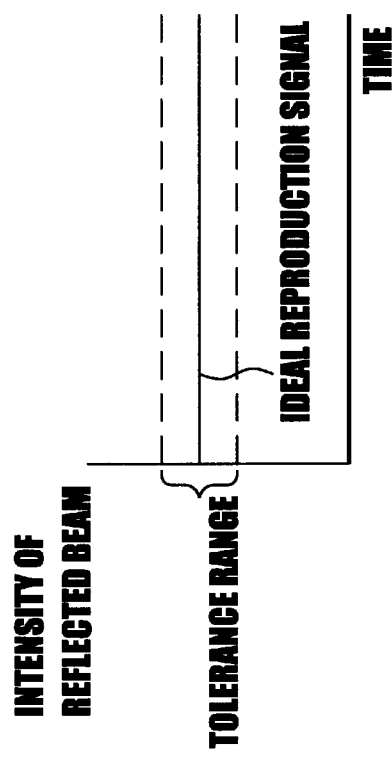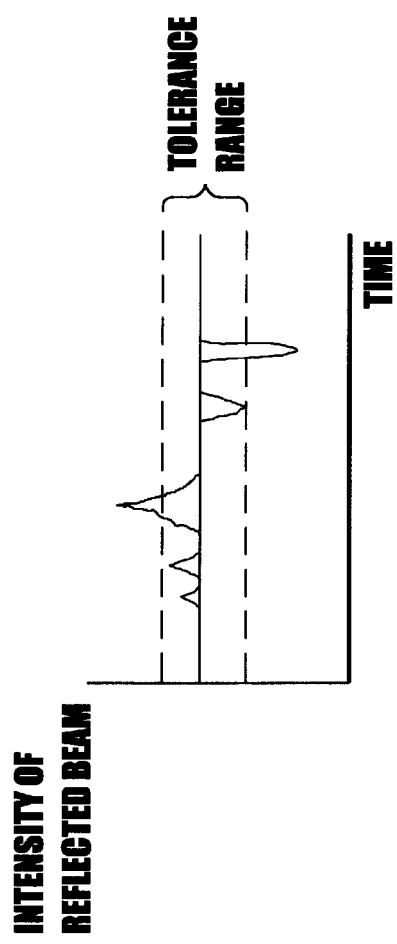

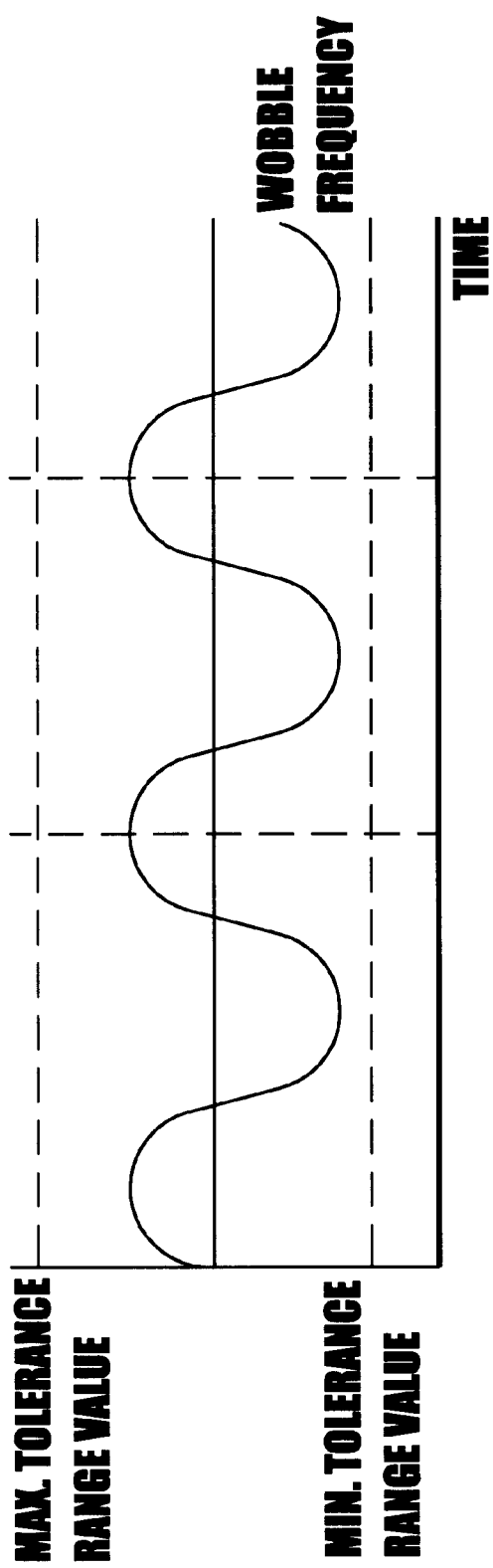

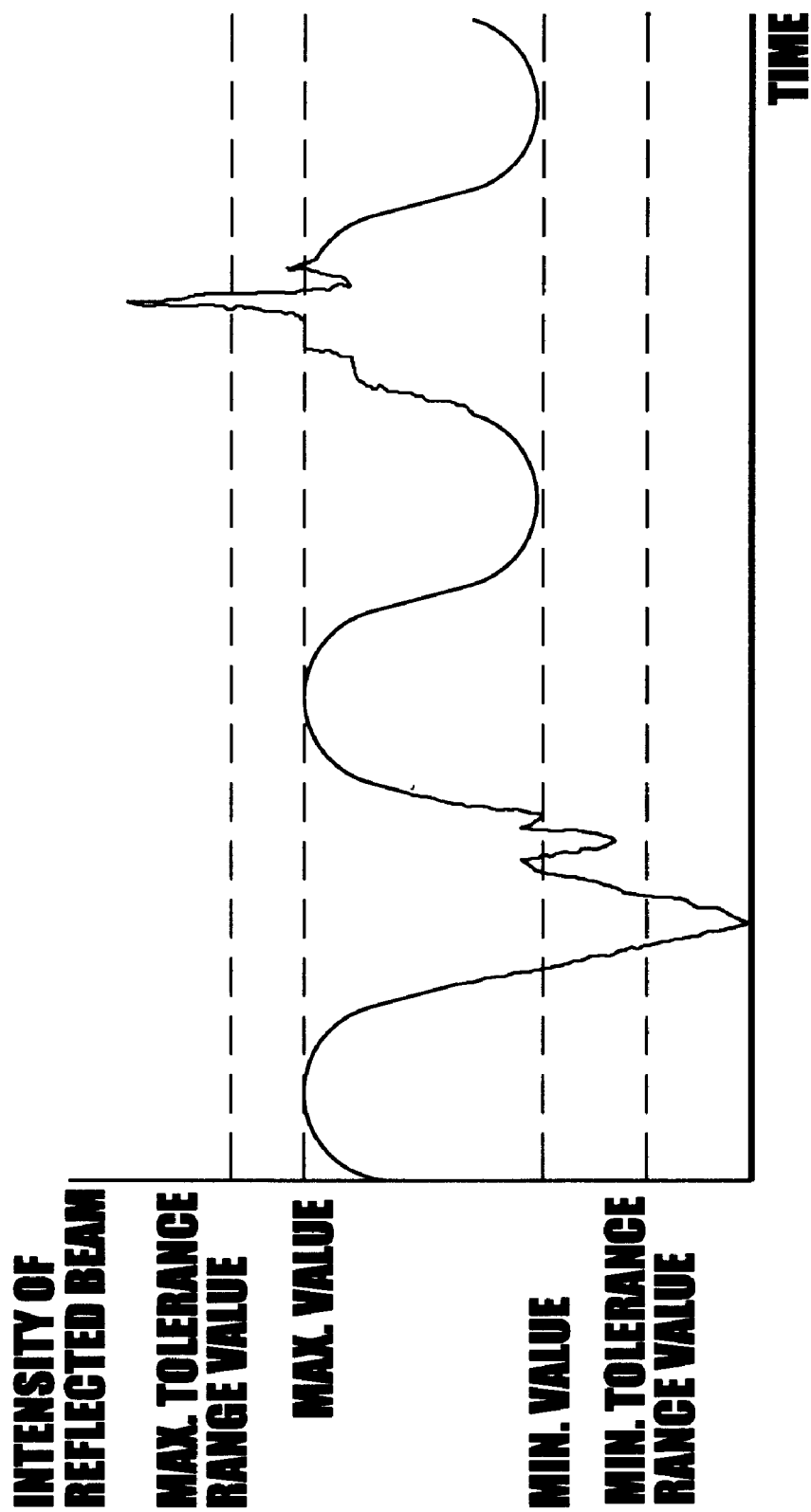

METHOD AND APPARATUS FOR TESTING QUALITY OF AN OPTICAL DISK MEDIUM

BACKGROUND OF THE INVENTION

1. Field of the Invention

The present invention relates to a method and apparatus for testing the quality of an optical disk medium; and more particularly, to such a method and apparatus having improved accuracy and reliability.

2. Description of Related Art

Optical disks are divided into three categories: (1) reproduction only such as CD and DVD-ROM, (2) write-once such as CD-R and DVD-R, and (3) rewritable such as CD-RW and DVD-RAM.

In spite of their different operating principles and usages, these optical disks have a similar structure such as shown in FIG. 1. As shown, a base substrate 100 includes grooves 110 formed therein which also forms lands 120 between the grooves 110. The side walls of the lands 120 are referred to as wobble because the side walls have alternating convex and concave curvature with respect to the center of the optical disk. When tracking a land or groove the adjacent wobble located closer to the center of the optical disk is referred to as the inner wobble, and the adjacent wobble located further from the center of the optical disk is referred to as the outer wobble.

Besides grooves, some of the above-referenced disks in their non-recorded state have pregrooves. Pregrooves are grooves including pits formed during the manufacture of the optical disk which define the format of the optical disk.

In their non-recorded state, optical disks are referred to as non-recorded optical disks. More specifically, a non-recorded optical disk is a disk that does not include user data such as program data.

With these optical disks conventional quality test methods involved recording signals in the lead-in area or main storage area of the disk, reproducing those test signals, and comparing the test signals to reference signals to determine quality.

Unfortunately, however, these methods cannot be applied to every optical disk manufactured. For instance, once test data is written into a write-once optical disk, that disk loses its value as a commercial good. Accordingly, samples from a plurality of manufactured optical disks are taken and tested according to the above-described methodology.

Besides rendering the sampled disks unusable, these quality testing techniques also prove to be inaccurate and unreliable. Just because the sampled disks may be of sufficient quality does not necessarily mean that the other disks, not sampled, are of sufficiently high quality. Therefore, these tests tend to be inaccurate and unreliable.

These optical disk media also undergo additional mechanical quality tests. For instance, the entire surface of the optical disk is displayed by monitoring the scanning of the optical disk surface with a laser beam using a CCD camera. The surface is then visually checked. Other tests include checking the location of the lead-in and lead-out for the main storage area.

SUMMARY OF THE INVENTION

One object of the present invention is to provide a method and apparatus for testing the quality of an optical disk which overcomes the drawbacks and disadvantages discussed above.

Another object of the present invention is to provide a method and apparatus for testing the quality of an optical disk which has improved reliability and accuracy.

A further object of the present invention is to provide a method and apparatus for testing the quality of an optical disk which allows an optical disk to be both quality tested and usable thereafter.

A still further object of the present invention is to provide a method and apparatus for testing the quality of an optical disk which determine quality based on a laser beam reflected from a non-recorded optical disk.

An additional object of the present invention is to provide a method and apparatus for testing the quality of an optical disk which determine quality based on an auxiliary signal corresponding to a preformatted structure of an optical disk.

These and other objectives are achieved by providing a method of testing optical disk quality, comprising: reproducing an auxiliary signal from an optical disk, said auxiliary signal corresponding to a preformatted structure of said optical disk; and determining quality of said optical disk based on said auxiliary signal.

These and other objectives are further achieved by providing an apparatus for testing optical disk quality, comprising: reproducing means for reproducing an auxiliary signal from an optical disk, said auxiliary signal corresponding to a preformatted structure of said optical disk; and determining means for determining quality of said optical disk based on said auxiliary signal.

These and other objectives are also achieved by providing a method of testing optical disk quality, comprising: irradiating a non-recorded optical disk with a laser beam; detecting said laser beam reflected from said non-recorded optical disk; and determining disk quality based on said reflected laser beam.

These and other objectives are additionally achieved by providing an apparatus for testing optical disk quality, comprising: reproducing means for irradiating a non-recorded optical disk with a laser beam, and for detecting said laser beam reflected from said non-recorded optical disk; and determining means for determining disk quality based on said reflected laser beam.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4a shows the tracking error when the pickup is transferred radially across the optical disk;

FIG. 5a shows the reflected beam spot when tracking the wobble center;

FIG. 5b shows the reflected beam spot when tracking the pregroove center;

FIG. 6 is a waveform showing an ideal playback signal when the recording layer is read out in accordance with FIGS. 5a and 5b;

FIG. 7 is a waveform showing the playback signal when the recording layer is read out in accordance with FIGS. 5a and 5b, and the recording layer is defective in its quality or includes foreign matter;

FIG. 8 is a waveform showing the ideal playback signal when the reflected beam spot moves along the outer or inner wobble center axis or the center axis of a groove;

FIG. 9 is a waveform showing an actual playback signal when the reflected beam spot moves along the outer or inner wobble center axis or the center axis of a groove, and the recording layer is defective in its quality or includes foreign matter;

DETAILED DESCRIPTION OF THE PREFERRED EMBODIMENTS

Figure 1:
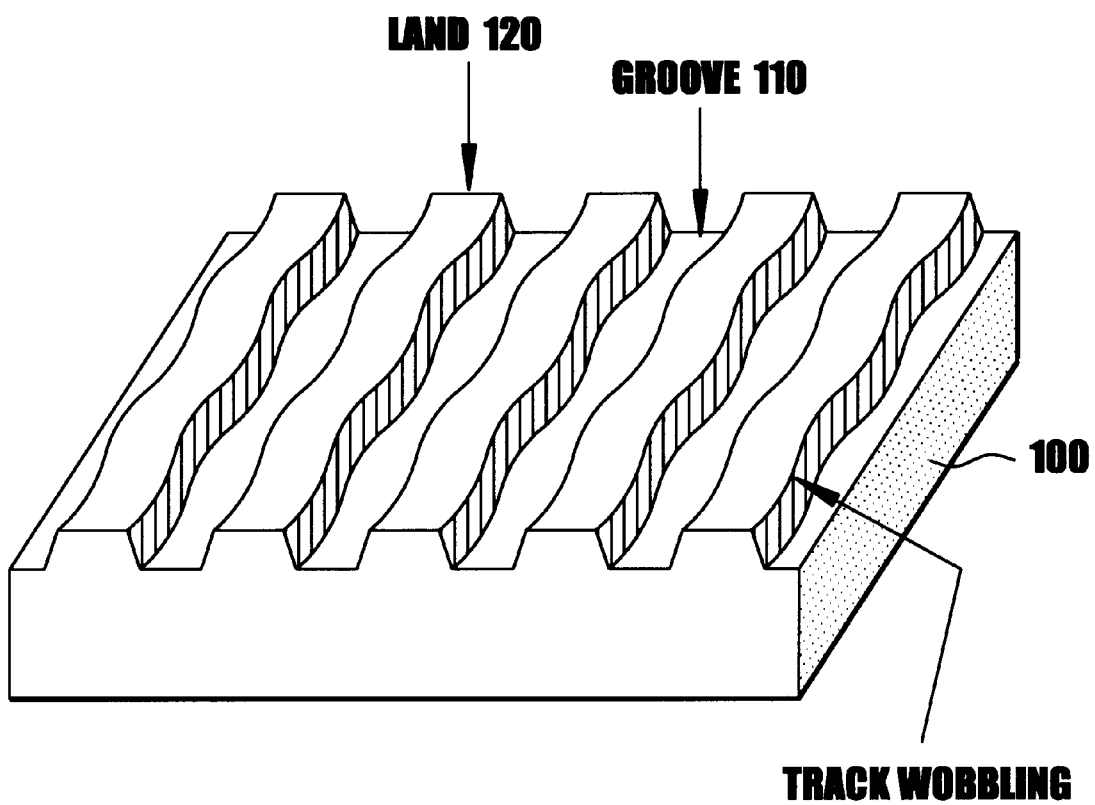
FIG. 1 illustrates a portion of a non-recorded optical disk.
Figure 2:
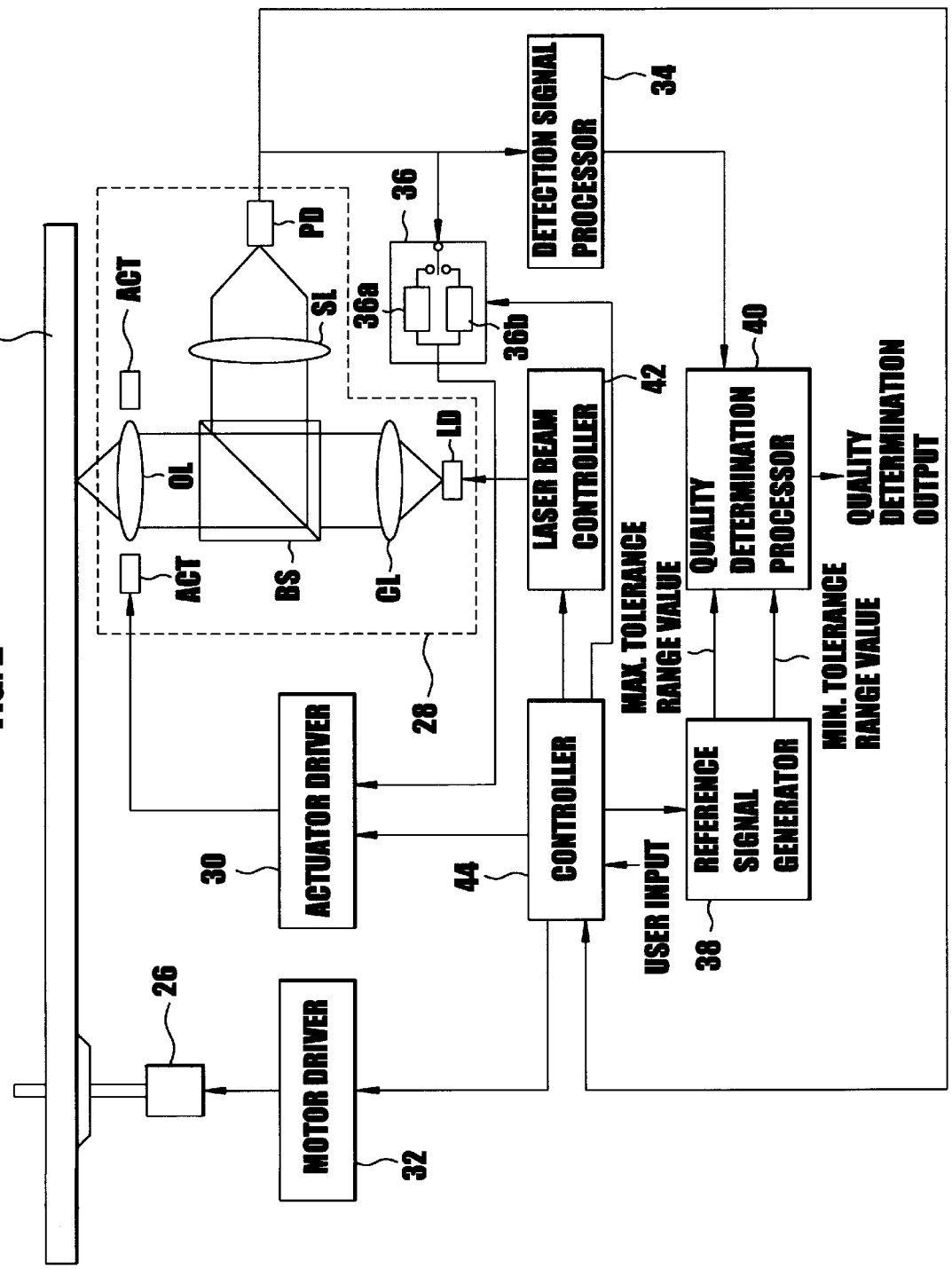
FIG. 2 is a schematic block diagram of an optical disk quality test apparatus according to the present invention.

FIG. 2 is a schematic block diagram of an optical disk quality test apparatus according to the present invention. As shown, the optical disk quality test apparatus includes a spindle motor 26 for rotating an optical disk 24. A motor driver 32 controls the operation of the spindle motor 26 based on instructions received from a controller 44. The controller 44 also outputs control signals to an actuator driver 30, a laser beam controller 42, a tracking controller 36, and a reference signal generator 38.

An optical pickup 28 reproduces data recorded on the optical disk 24. As shown in FIG. 2, the optical pickup 28 includes a laser diode LD which emits a laser beam. The laser beam is collimated by collimating lens CL, passes through a beam splitter BS, and is focused upon the optical disk 24 by an objective lens OL. The laser beam is reflected by the optical disk 24, passes through the objective lens OL, and is directed towards a photo detector PD by the beam splitter BS. A sensor lens SL in the optical pickup 28 focuses the reflected laser beam on the photo diode PD. Also, an actuator ACT controls the position of the objective lens OL, and thus the focusing of the laser beam on the optical disk 24.

The reproduced signal output by the optical pickup 28 is supplied to the tracking controller 36, a detection signal processor 34, and the controller 44. Based on the reproduced signal, the controller 44 determines a focus error, and outputs control signals to the actuator driver 30. The tracking controller 36 determines a tracking error based on the reproduced signal and outputs control signals in accordance with the tracking error to the actuated driver 30. Based on the control signals received from the controller 34 and the tracking controller 36, the actuator driver 30 controls the position of the objective lens OL via the actuator ACT.

The optical disk quality test apparatus according to the present invention is not limited to testing the quality of a particular optical disk, but can test the quality of an optical disk regardless of format. For instance, the optical disk quality apparatus can test the quality of CD-R, CD-RW, DVD-R, DVD-RW, and DVD-RAM optical disks. When a quality determination is to take place, a user instructs the controller 44 to perform an optical disk quality test. In response, the controller 44 instructs a laser beam controller 32 to cause the laser diode LD to emit a laser beam such that the controller 44 can determine the type of the optical disk 24 based on the reproduced signal output from the optical pickup 28. The optical disk quality test apparatus according to the present invention can determine the type of optical disk being tested in any well known manner or as disclosed in U.S. application Ser. No. 08/567,041 filed on Dec. 4, 1995 by Kim et al., the entire contents of which are hereby incorporated by reference.

Instead of automatically determining the type of optical disk, the type of optical disk can be indicated via user input received by the controller 44.

Once the type of optical disk has been determined, the controller 44 instructs the laser beam controller 44 to cause the laser diode LD to emit a laser beam associated with the type of optical disk being tested.

As shown in FIG. 2, the tracking controller 36 includes a wobble center axis tracking controller 36a and a track center axis tracking controller 36b. Based on a control signal from the controller 44, either the wobble center axis tracking controller 36a or the track center axis tracking controller 36b is used to perform tracking. The track center axis tracking controller 36b performs tracking servo control to track a groove, pregroove or land according to the well-known push/pull method. The wobble center axis controller 36a performs tracking servo control to track the center axis of an inner or outer wobble. Instead of tracking the center axis of a land, groove, pregroove or wobble, the tracking controller 36 can be configured to track the center of the land, groove, pregroove or wobble. Tracking the center of one of these preformatted structures, however, requires fine tracking control. As such, it is preferable to track the center axis of these preformatted structures. It should be understood that the term preformatted structure describes the structure of the optical disk prior to data being recorded thereon.

Figure 3:
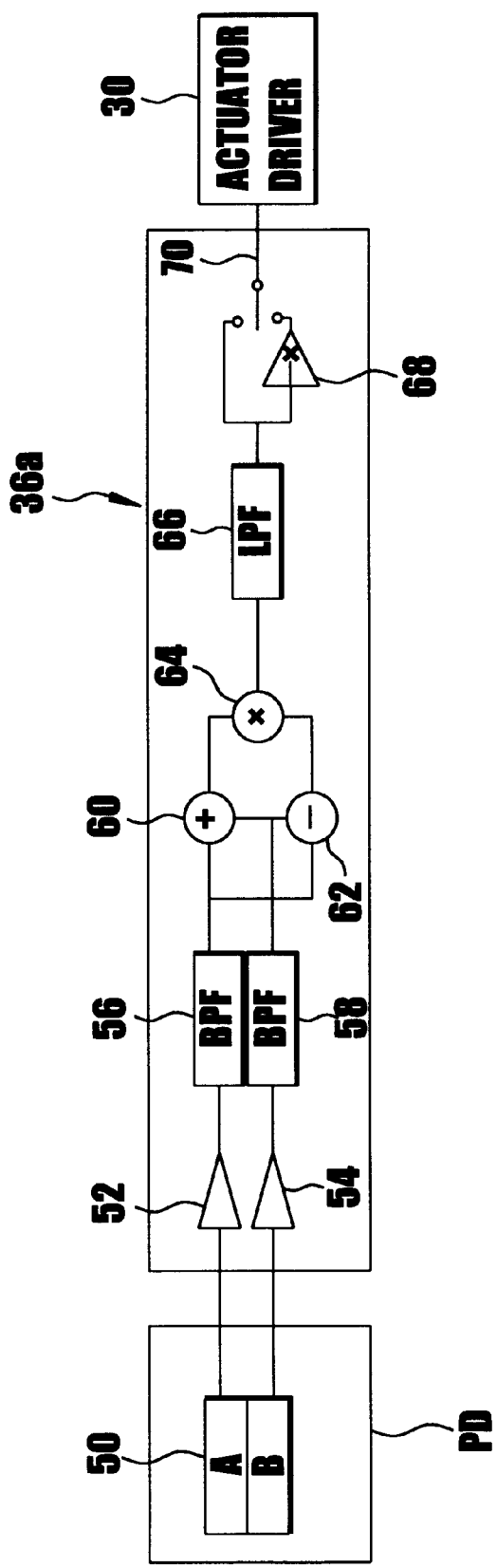
FIG. 3 is a block diagram of an embodiment of the wobble center axis tracking controller shown in FIG. 2.

FIG. 3 illustrates one embodiment of the wobble center axis tracking controller 36a. As shown in FIG. 3, the photo diode PD includes a photo diode portion 50 having left and right areas A and B. The outputs of the left and right area A and B are supplied to respective first and second amplifiers 52 and 54. First and second band pass filters 56 and 58 filter the output of the first and second amplifiers 52 and 54, respectively. The pass band of the first and second band pass filters 56 and 58 are set to pass only the corresponding wobble frequency band of the optical disk being tested, which is dependent upon the type of optical disk. Accordingly, if the controller 44, based on user input, selects the wobble center axis tracking controller 36a, then the controller 44 will also set the pass band of the first and second band pass filters 56 and 58 based on the determined type of the optical disk 24.

An adder 60 sums the outputs of the first and second band pass filters 56 and 58 to produce a summation signal, and a subtractor 62 subtracts the output of the second band pass filter 58 from the output of the first band past filter 56 to produce a difference signal. A mixer 64 mixes the summation and difference signals to produce a mixed signal which includes a. tracking error signal. A low pass filter 66 filters the output of the mixer 64 to produce the tracking error signal.

An invertor 68 inverts the tracking error signal, and a selection switch 70 selectively passes the tracking error signal or the inverted tracking error signal to the actuator driver 30.

During operation, initial tracking is achieved by tracking either a groove or land. For purposes of discussion, it will be assumed that a groove is initially being tracked. Accordingly, the tracking error produced when tracking the groove center axis is 0 as shown at point a in FIG. 4a. The controller 44, based on the type of the optical disk 24, causes the actuator driver 30 to shift the optical pickup 28 about half a track pitch towards the center of the optical disk 24 if a user desires tracking of the inner wobble center axis, or a half-track pitch away from the center of the optical disk 24 if a user desires tracking of the outer wobble center axis. Also, if tracking of the outer wobble center axis is desired, then the controller 44 causes the selection switch 70 to output the tracking error signal to the actuator driver 30, but if the inner wobble center axis is to be tracked, the controller 44 causes the selection switch 70 to output the inverse tracking error signal to the actuator driver 30. The wobble center axis tracking controller 36a will then control the actuator driver 30 to reduce the tracking error to 0 such as shown at point b (for outer wobble center axis tracking) and point c (for inner wobble center axis tracking) in FIG. 4a.

Figure 4C:
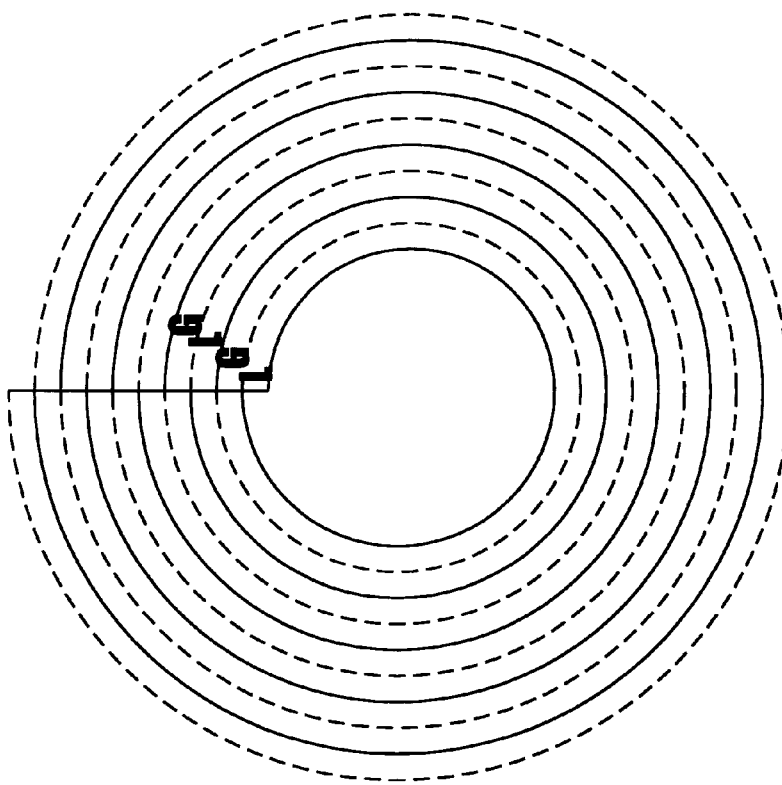
FIG. 4c is a schematic view showing the land/groove track of a 1 spiral track type optical disk.
Figure 4B:
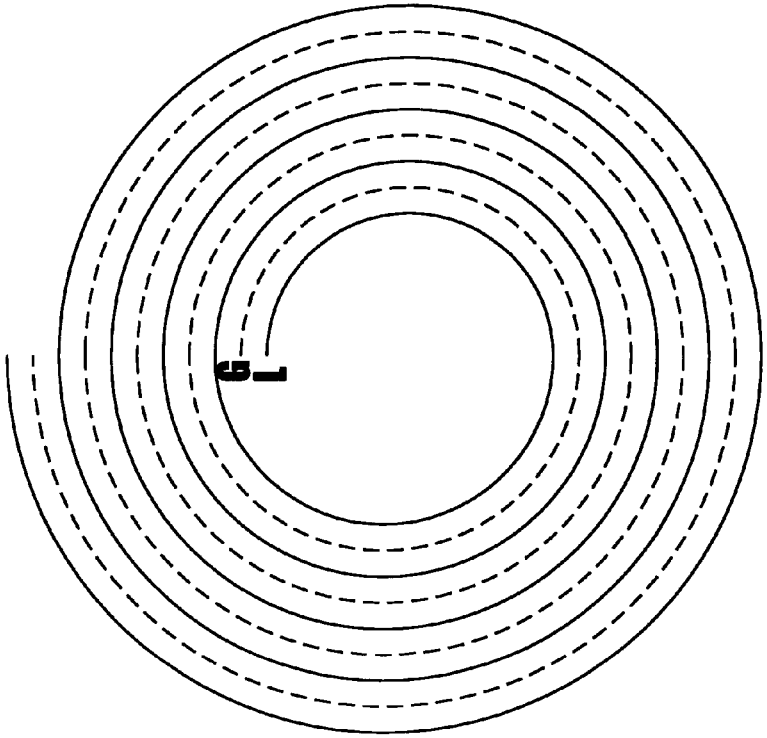
FIG. 4b is a schematic view showing the land/groove track of a 2 spiral track type optical disk.

Depending on the optical disk format, an optical disk can have two spiral tracks, one land and one groove, as shown in FIG. 4b, or the optical disk can have a single spiral track such as shows in FIG. 4c. The DVD-RAM, for instance, has the track format shown in FIG. 4c. As shown in FIG. 4c, after the first turn, the land center axis becomes the groove center axis, and vice versa. Consequently if a user desires to follow the inner wobble of a DVD-RAM, then the controller 44 causes the selection switch 70 to switch between the tracking error signal and the inverted tracking error signal every turn of the optical disk 24.

It should be understood, that tracking the inner and outer wobble center axes can also be performed according to the well-known push/pull method. When this method is used, after initial tracking of a land or groove, the controller 44 again causes the optical pickup 28 to shift one-half track pitch either towards or away from the center of the optical disk, and then the push/pull method is used to track the associated wobble.

Returning to FIG. 2, after appropriate tracking is achieved, the reproduced signal output by the optical pickup 28 undergoes signal processing, such as amplification, performed by the detection signal processor 34. A quality determination processor 40 receives the output of the detection signal processor 34, and determines the quality of the optical disk 24 based on the processed reproduced signal and tolerance range data supplied by a reference signal generator 38. When the processed reproduced signal falls within the tolerance range provided by the reference signal generator 38, the quality determination processor 40 determines that the optical disk is of good quality. If the processed reproduced signal falls outside the tolerance range provided by the reference signal generator 38, then the quality determination processor 40 determines that the optical disk is of poor quality.

The operation of the quality determination processor 40 will now be described in detail. As discussed above, the optical disk quality test apparatus according to the present invention can test the quality of an optical disk regardless of format. This is achieved in part by using the reference signal generator 38 which stores tolerance range data for each possible optical disk format such as CD-R, CD-RW, DVD-R, DVD-RW, DVD-RAM, etc. Besides the type of the optical disk 24, the preformatted structure and type of tracking affects the processed reproduced signal output by the detection signal processor 34. As described in detail below, tracking a preformatted structure results in the production of an auxiliary signal representative of that structure. Consequently, even though no data has been recorded on the optical disk, a signal indicative of the quality of the optical disk can be produced based on the structure of the optical disk created during the optical disk's manufacture. Also, the form of the reproduced signal depends on the type of tracking (e.g., tracking the center or center axis of a preformatted structure). Therefore, the reference signal generator 38 stores tolerance range data associated with the different types of preformatted structures and tracking for each type of optical disk.

When the controller 44 determines the type of the optical disk 24 and receives user input as to which preformatted structure to track and the type of tracking (if not predetermined by the structure of the tracking controller 36), the controller 44 causes the reference signal generator 38 to output the corresponding tolerance range data. The quality determination processor 40 then compares the processed reproduced signal to the tolerance range data output from the reference signal generator 38 in the manner discussed above.

To better understand the operation of the optical disk quality test apparatus according to the present invention, the operation of the optical disk quality test apparatus will be discussed with respect to the testing of a CD-RW. After determining the type of optical disk, the controller 44 will cause the laser beam controller 42 to set the wave length of the laser beam emitted by the laser diode LD to 780 nm as prescribed by the CD-RW format. If a user selects tracking of the center of a wobble such as shown in FIG. 5a or the center of a pregroove such as shown in FIG. 5b, then the ideal reproduction signal would be a shown in FIG. 6.

The controller 44 causes the reference signal generator 38 to output the tolerance range data (maximum tolerance range value and minimum tolerance range value) associated with tracking the center of a wobble or a pregroove in a CD-RW optical disk. If as shown in FIG. 6, the reproduction signal falls within the tolerance range, then the quality determination processor 40 determines that the optical disk is of good quality.

However, if the optical disk includes defects such as foreign substances in the recording layer, the processed reproduced signal may appear as shown in FIG. 7. As shown in FIG. 7, due to the defects in the optical disk, the processed reproduced signal will exceed the tolerance range. Accordingly, the quality determination processor 40 determines that the optical disk is of poor quality.

As discussed above, since fine tracking servo control is required to make the laser beam spot track substantially the center of a preformatted structure, it is preferable to track the center axis of the preformatted structure (i.e., groove, pregroove, land, inner wobble, or outer wobble). Because of the alternating curvature of these preformatted structures, the reproduced signal regularly changes in time. FIG. 8 illustrates the ideal processed reproduced signal when tracking the center axis of a preformatted structure.

Figure 10:
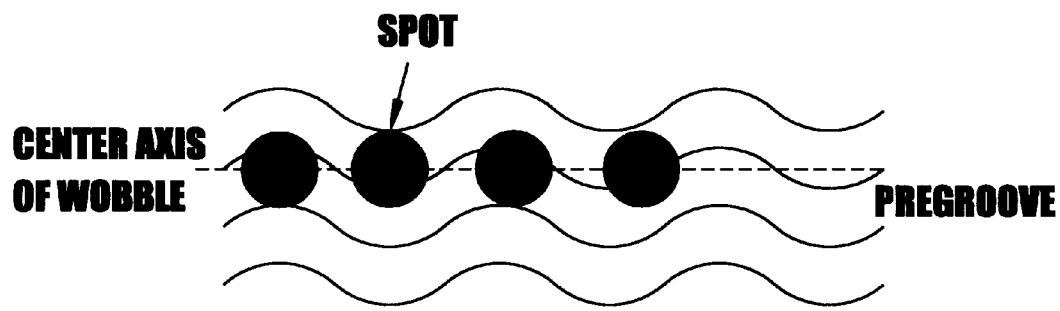
FIG. 10 shows the reflected beam spot when tracking the outer wobble center axis of a CD-RW or CD-R disk.
Figure 11:
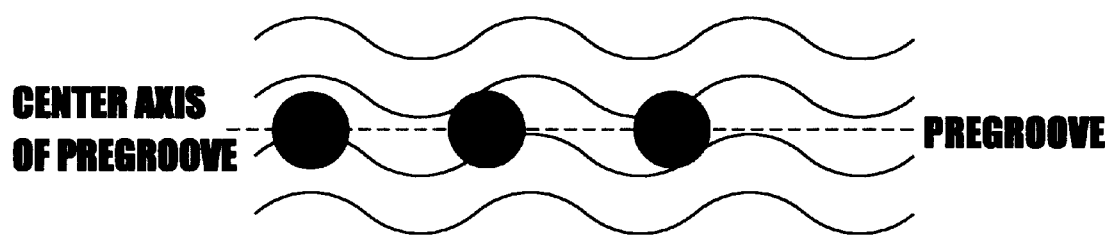
FIG. 11 shows the reflected beam spot when tracking the pregroove center axis of a CD-RW or CD-R.
Figure 12:
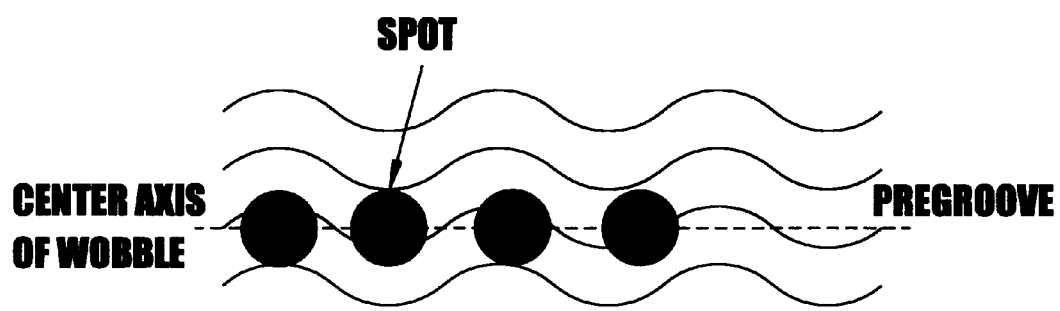
FIG. 12 shows the reflected beam spot when tracking the inner wobble center axis of a CD-RW or CD-R.

Returning to the CD-RW example, if a user selects center axis tracking of the outer wobble such as shown in FIG. 10, the pregrooves such as shown in FIG. 11, or the inner wobble such as shown in FIG. 12, the ideal processed reproduced signal would appear as shown in FIG. 8.

In this instance, the controller 44 would cause the reference signal generator 38 to output the 30 tolerance range data associated with center axis tracking of, for example, the outer wobble, if the outer wobble were being tracked, for a CD-RW optical disk. The quality determination processor 40 would then compare the processed reproduced signal to this tolerance range data such as shown in FIG. 8. As shown, because the processed reproduced signal falls within the tolerance range output by the reference signal generator 38, the quality determination processor 40 determines that the optical disk 24 is of good quality.

If, however, the optical disk 24 includes defects, then the processed reproduced signal would appear as shown FIG. 9. As shown, the processed reproduced signal exceeds the tolerance range output by the reference signal generator 38. Consequently, the quality determination processor 40 determines that the optical disk 24 is of poor quality.

The tolerance range data stored in the reference signal generator 38 is empirically predetermined tolerance data. The following is a discussion of the empirical determination of the tolerance range data for several different optical disk formats and tracking of different preformatted structures for each optical disk format. For each case, however, center axis tracking was performed.

EXAMPLE 1

CASE 1) CD-RW samples were prepared. As shown in FIG. 10, when the laser beam spot was controlled to output a reproduction signal from the samples by tracking the center axis of the outer wobble, the sample disks were tested in relation to different, maximum tolerance values and different minimum tolerance values.

The carrier-to-noise ratios CNRs were tested when a maximum tolerance range E1 is: $0\% \leq E1 < 3\%$, $3\% \leq E1 < 5\%$, $5\% \leq E1 < 7\%$, $7\% \leq E1 < 10\%$, and $10\% \leq E1 < 13\%$ of a maximum value. Also, CNRs were tested when a minimum tolerance range E2 is: $0\% \leq E2 < 3\%$, $3\% \leq E2 < 5\%$, $5\% \leq E2 < 7\%$, $7\% \leq E2 < 10\%$, and $10\% \leq E2 < 13\%$ of a minimum value. Each of the CNRs in the following Tables 1 and 2 is an average CNR value of 10 sample disks within the respective tolerance range.

TABLE 1

| Maximum Tolerance Range | $0\% \leq E1 < 3\%$ | $3\% \leq E1 < 5\%$ | $5\% \leq E1 < 7\%$ |
|---|---|---|---|
| CNR (dB) | 74 | 69 | 55 |
| Maximum Tolerance Range | $7\% \leq E1 < 10\%$ | $10\% \leq E1 < 13\%$ | |
| CNR (dB) | 43 | 26 | |

TABLE 2

| Minimum Tolerance Range | $0\% \leq E2 < 3\%$ | $3\% \leq E2 < 5\%$ | $5\% \leq E2 < 7\%$ |
|---|---|---|---|
| CNR (dB) | 83 | 72 | 59 |
| Minimum Tolerance Range | $7\% \leq E2 < 10\%$ | $10\% \leq E2 < 13\%$ | |
| CNR (dB) | 47 | 30 | |

A reproduction signal CNR of 26 dB or more is normally considered as good. However, only when a non recorded disk has a CNR of 47 dB or more, is it considered that the disk has substantially stable recording characteristic. Therefore, if the maximum tolerance range and the minimum tolerance range were less than 7%, quality of a recording layer could be classified as good and having stable recording characteristic.

CASE 2) CD-RW samples were prepared. As shown in FIG. 11, when the laser beam spot was controlled to output a reproduction signal by tracking the center axis of the pregroove, the sample disks were tested in relation to different maximum tolerance values and to different minimum tolerance values.

The CNRs were tested when a maximum tolerance range E1 is: $0\% \leq E1 < 3\%$, $3\% \leq E1 < 5\%$, $5\% \leq E1 < 7\%$, $7\% \leq E1 < 10\%$, and $10\% \leq E1 < 13\%$ of a maximum value. Also, the CNRs were tested when a minimum tolerance range E2 is: $0\% \leq E2 < 3\%$, $3\% \leq E2 < 5\%$, $5\%s E2 < 7\%$, $7\% \leq E2 < 10\%$, a $10\% \leq E2 < 13\%$ of a minimum value. Each of the CNRs in the following Tables 3 and 4 is an average CNR value of 10 sample disks within the respective tolerance range.

TABLE 3

| Maximum Tolerance Range | $0\% \leq E1 < 3\%$ | $3\% \leq E1 < 5\%$ | $5\% \leq E1 < 7\%$ |
|---|---|---|---|
| CNR (dB) | 71 | 59 | 51 |
| Maximum Tolerance Range | $7\% \leq E1 < 10\%$ | $10\% \leq E1 < 13\%$ | |
| CNR (dB) | 40 | 31 | |

TABLE 4

| Minimum Tolerance Range | 0% ≤ E2 < 3% | 3% ≤ E2 < 5% | 5% ≤ E2 < 7% |
|---|---|---|---|
| CNR (dB) | 70 | 61 | 49 |
| Minimum Tolerance Range | 7% ≤ E2 < 10% | 10% ≤ E2 < 13% | |
| CNR (dB) | 38 | 29 | |

According to results of the tests, if the maximum tolerance range and the minimum tolerance range were less than 7%, quality of a recording layer could be classified as good and having stable recording characteristic.

CASE 3) CD-RW samples were prepared as in CASE 1. As shown in FIG. 12, when the laser beam spot was controlled to output a reproduction signal by tracking the center axis of the inner wobble signal, the sample disks were tested in relation to different maximum tolerance values and different minimum tolerance values.

The CNRs were tested when a maximum tolerance range $E1$ is: $0\% \leq E1 < 3\%$, $3\% \leq E1 < 5\%$, $5\%5 \leq E1 < 7\%$, $7\% \leq E1 < 10\%$, and $10\% \leq E1 < 13\%$ of a maximum value. Also, the CNRs were tested when a minimum tolerance range $E2$ is: $0\% \leq E2 < 3\%$, $3\% \leq E2 < 5\%$, $5\% \leq E2 < 7\%$, $7\% \leq E2 < 10\%$, and $10\% \leq E2 < 13\%$ of a minimum value. Each of the CNRs in the following Tables 5 and 6 is an average CNR value of 10 sample disks within the respective tolerance range.

TABLE 5

| Maximum Tolerance Range | 0% ≤ E1 < 3% | 3% ≤ E1 < 5% | 5% ≤ E1 < 7% |
|---|---|---|---|
| CNR (dB) | 85 | 70 | 63 |
| Maximum Tolerance Range | 7% ≤ E1 < 10% | 10% ≤ E1 < 13% | |
| CNR (dB) | 55 | 39 | |

TABLE 6

| Minimum Tolerance Range | 0% ≤ E2 < 3% | 3% ≤ E2 < 5% | 5% ≤ E2 < 7% |
|---|---|---|---|
| CNR (dB) | 82 | 68 | 55 |
| Minimum Tolerance Range | 7% ≤ E2 < 10% | 10% ≤ E2 < 13% | |
| CNR (dB) | 42 | 31 | |

When the maximum tolerance range was less than 10%, and the minimum tolerance range was less than 7%, the CNR level was stable. However, for stricter quality control, the maximum tolerance range and the minimum tolerance range were limited to less than 7%.

EXAMPLE 2

CD-R samples were prepared and tests for quality of the recording layers of the sample disks were done by the same method as the CD-RW examples above.

CASE 1) As shown in FIG. 10, when the laser beam spot was controlled to output a reproduction signal by tracking the center axis of the outer wobble, the sample disks were tested in relation to different maximum tolerance values and different minimum tolerance values.

The CNRs were tested when a maximum tolerance range $E1$ is: $0\% \leq E1 < 3\%$, $3\% \leq E1 < 5\%$, $5\% \leq E1 < 7\%$, $7\% \leq E1 < 10\%$, and $10\% \leq E1 < 13\%$ of a maximum value. Also, the CNRs were tested when a minimum tolerance range $E2$ is: $0\% \leq E2 < 3\%$, $3\% \leq E2 < 5\%$, $5\% \leq E2 < 7\%$, $7\% \leq E2 < 10\%$ and $10\% \leq E2 < 13\%$ of a maximum value. Each of the CNRs in the following Tables 7 and 8 is an average CNR value of 10 sample disks within the respective tolerance range.

TABLE 7

| Maximum Tolerance Range | 0% ≤ E1 < 3% | 3% ≤ E1 < 5% | 5% ≤ E1 < 7% |
|---|---|---|---|
| CNR (dB) | 92 | 80 | 67 |
| Maximum Tolerance Range | 7% ≤ E1 < 10% | 10% ≤ E1 < 13% | |
| CNR (dB) | 55 | 49 | |

TABLE 8

| Minimum Tolerance Range | 0% ≤ E2 < 3% | 3% ≤ E2 < 5% | 5% ≤ E2 < 7% |
|---|---|---|---|
| CNR (dB) | 89 | 72 | 59 |
| Minimum Tolerance Range | 7% ≤ E2 < 10% | 10% ≤ E2 < 13% | |
| CNR (dB) | 48 | 29 | |

According to results of the tests, if the maximum tolerance range and the minimum tolerance range were less than 10%, quality of a recording layer could be classified as good and having stable recording characteristic.

CASE 2) CD-R samples were prepared. As shown in FIG. 11, when the laser beam spot was controlled to output a reproduction signal by tracking the center axis of the pregroove, the sample disks were tested in relation to different maximum tolerance values and different minimum tolerance values.

The CNRs were tested when a maximum tolerance range $E1$ is: $0\% \leq E1 < 3\%$, $3\% \leq E1 < 5\%$, $5 \leq E1 < 7\%$ $7\% \leq E1 < 10\%$, and $10\% \leq E1 < 13\%$ of a maximum value. Also, the CNRs were tested when a minimum tolerance range $E2$ is: $0\% \leq E2 < 3\%$, $3\% \leq E2 < 5\%$, $5\% \leq E2 < 7\%$, $7\% \leq E2 < 10\%$, and $10\% \leq E2 < 13\%$ of a minimum value. Each of CNRs in the following Tables 9 and 10 is an average CNR value of 10 sample disks within the respective tolerance range.

TABLE 9

| Maximum Tolerance Range | 0% ≤ E1 < 3% | 3% ≤ E1 < 5% | 5% ≤ E1 < 7% |
|---|---|---|---|
| CNR (dB) | 83 | 71 | 62 |
| Maximum Tolerance Range | 7% ≤ E1 < 10% | 10% ≤ E1 < 13% | |
| CNR (dB) | 50 | 27 | |

TABLE 10

| Minimum Tolerance Range | 0% ≤ E2 < 3% | 3% ≤ E2 < 5% | 5% ≤ E2 < 7% |
|---|---|---|---|
| CNR (dB) | 85 | 74 | 69 |
| Minimum Tolerance Range | 7% ≤ E2 < 10% | 10% ≤ E2 < 13% | |
| CNR (dB) | 49 | 24 | |

According to results of the tests, if the maximum tolerance range and the minimum tolerance range were less than 10%, quality of a recording layer could be classified as good and having stable recording characteristic.

CASE 3) CD-R samples were prepared. As shown in FIG. 12, when the laser beam spot was controlled to output a reproduction signal by tracking the center axis of the inner wobble, the sample disks were tested in relation to different maximum tolerance values and different minimum tolerance values.

The CNRs were tested when a maximum tolerance range E1 is: 0%≤E1<3%, 3%≤E1<5%, 5%≤E1<7%, 7%≤E1<10%, and 10%≤E1<13% of a maximum value. Also, the CNRs were tested when a minimum tolerance range E2 is: 0%≤E2<3%, 3%≤E2<5%, 5%≤E2<7%, 7%≤E2<10%, and 10%≤E2<13% of a maximum value. Each of the CNRs in the following Tables 11 and 12 is an average CNR value of 10 sample disks within the respective tolerance

TABLE 11

| Maximum Tolerance Range | 0% ≤ E1 < 3% | 3% ≤ E1 < 5% | 5% ≤ E1 < 7% |
|---|---|---|---|
| CNR (dB) | 96 | 80 | 74 |
| Maximum Tolerance Range | 7% ≤ E1 < 10% | 10% ≤ E1 < 13% | |
| CNR (dB) | 58 | 32 | |

TABLE 12

| Minimum Tolerance Range | 0% ≤ E2 < 3% | 3% ≤ E2 < 5% | 5% ≤ E2 < 7% |
|---|---|---|---|
| CNR (dB) | 94 | 83 | 69 |

TABLE 12-continued

| Minimum Tolerance Range | 7% ≤ E2 < 10% | 10% ≤ E2 < 13% |
|---|---|---|
| CNR (dB) | 51 | 42 |

According to results of the tests, if the maximum tolerance range and the minimum tolerance range were less than 10%, quality of a recording layer could be classified as good and having stable recording characteristic.

EXAMPLE 3

A laser beam from a laser diode having a wavelength of 650 nm was used on DVD-Rs. In the case where a DVD-R is in good condition, the laser beam spot tracks the center axis of a wobble or groove, and an ideal reproduction signal as shown in FIG. 8 is output in the form of the wobble frequency which corresponds to the intensity of a reflected light which regularly changes relative to time.

However, if there is defect (abnormality) in quality of the recording layer or there are foreign substances in the recording layer, the reproduction signal has an abnormal waveform as shown in FIG. 9.

The quality of a DVD-R disk is determined based on a maximum tolerance range and a minimum tolerance range. That is, if intensity of the reflected light from the disk under test is over the maximum tolerance range or under the minimum tolerance range, the disk under test is classified as poor quality (i.e., without commercial value). If the intensity of the reflected light from the disk under test is between the maximum tolerance range and the minimum tolerance range, the disk under test is classified as good quality. The maximum tolerance range and the minimum tolerance range are determined by repetitive testing as described below.

Figure 13:
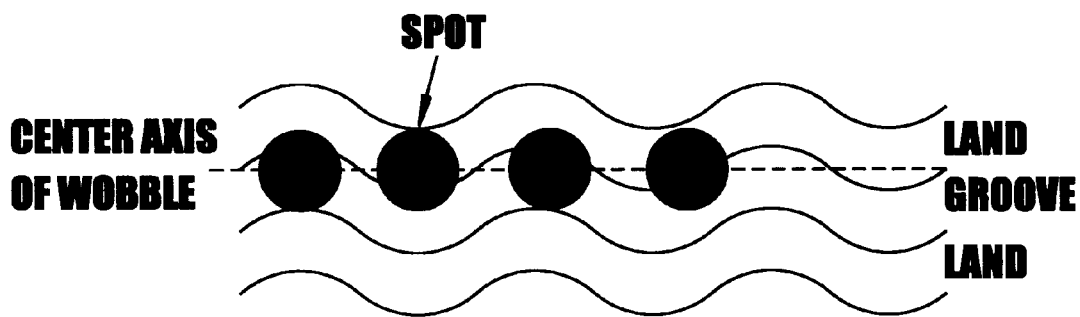
FIG. 13 shows the reflected beam spot when tracking the outer wobble center axis of a DVD-R or DVD-RAM.

CASE 1) As shown in FIG. 13, when the laser beam spot was controlled to output a reproduction signal by tracking the center axis of the outer wobble, the sample disks were tested in relation to different maximum tolerance values and different minimum tolerance values.

The CNRs were tested when a maximum tolerance range E1 is: 0%≤E1<3%, 3%≤E1<5%, 5%≤E1<7%, 7%≤E1<10%, and 10%≤E1<13% of a maximum value. Also, the CNRs were tested when a minimum tolerance range E2 is: 0%≤E2<3%, 3%≤E2<5%, 5%≤E2<7%, 7%≤E2<10%, and 10%≤E2<13% of a minimum value. Each of the CNRs in the following Tables 13 and 14 is an average CNR value of 10 sample disks within the respective tolerance range.

TABLE 13

| Maximum Tolerance Range | 0% ≤ E1 < 3% | 3% ≤ E1 < 5% | 5% ≤ E1 < 7% |
|---|---|---|---|
| CNR (dB) | 68 | 55 | 41 |
| Maximum Tolerance Range | 7% ≤ E1 < 10% | 10% ≤ E1 < 13% | |
| CNR (dB) | 30 | 19 | |

TABLE 14

| Minimum Tolerance Range | 0% ≤ E2 < 3% | 3% ≤ E2 < 5% | 5% ≤ E2 < 7% |
|---|---|---|---|
| CNR (dB) | 65 | 49 | 37 |
| Minimum Tolerance Range | 7% ≤ E2 < 10% | 10% ≤ E2 < 13% | |
| CNR (dB) | 24 | 15 | |

According to results of the tests, if the maximum tolerance range and the minimum tolerance range were less than 5%, quality of a recording layer could be classified as good and having stable recording characteristic.

Figure 14:
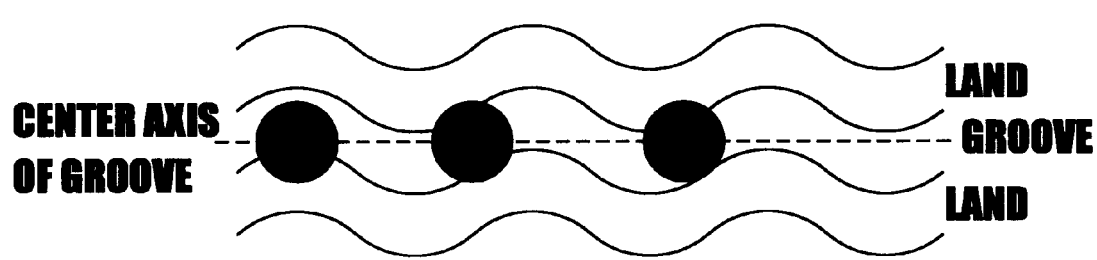
FIG. 14 shows the reflected beam spot when tracking the center axis of a groove of a DVD-R or DVD-RW.
Figure 15:
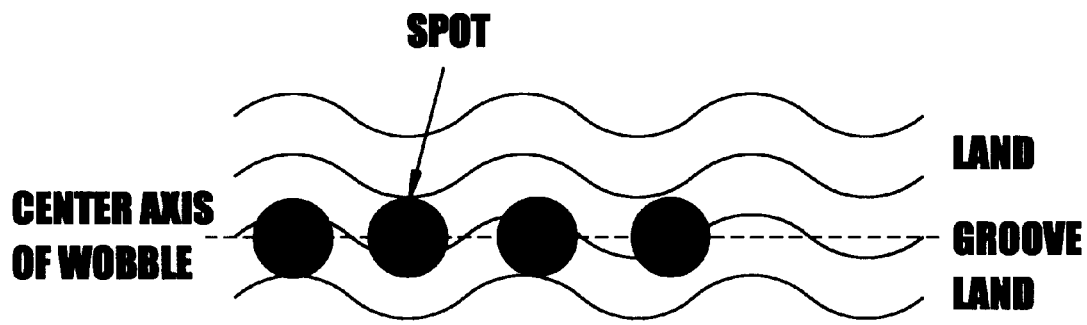
FIG. 15 shows the reflected beam spot when tracking the inner wobble center axis of a DVD-R or DVD-RAM.

CASE 2) As shown in FIG. 14, when the laser beam spot was controlled to output a reproduction signal by tracking the center axis of the groove, the sample disks were tested in relation to different maximum tolerance values and different minimum tolerance values.

The CNRs were tested when a maximum tolerance range E1 is: 0%≤E1<3%, 3%≤E1<5%, 5%≤E1<7%, 7%≤E1<10%, and 10%≤E1<13% of a maximum value. Also, the CNRs were tested when a minimum tolerance range E2 is: 0%≤E2<3%, 3%≤E2<5%, 5%≤E2<7%, 7%≤E2<10%≤E2<13% of a minimum value. Each of the CNRs in the following Tables 15 and 16 is an average CNR value of 10 sample disks within the respective tolerance range.

TABLE 15

| Maximum Tolerance Range | 0% ≤ E1 < 3% | 3% ≤ E1 < 5% | 5% ≤ E1 < 7% |
|---|---|---|---|
| CNR (dB) | 61 | 49 | 32 |
| Maximum Tolerance Range | 7% ≤ E1 < 10% | 10% ≤ E1 < 13% | |
| CNR (dB) | 24 | 10 | |

TABLE 16

| Minimum Tolerance Range | 0% ≤ E2 < 3% | 3% ≤ E2 < 5% | 5% ≤ E2 < 7% |
|---|---|---|---|
| CNR (dB) | 85 | 74 | 69 |
| Minimum Tolerance Range | 7% ≤ E2 < 10% | 10% ≤ E2 < 13% | |
| CNR (dB) | 49 | 24 | |

According to results of the tests, if the maximum tolerance range and the minimum tolerance range were less than 5%, quality of a recording layer could be classified as good and having stable recording characteristic.

CASE 3) As shown in FIG. 5, when the laser beam spot was controlled to output a reproduction signal by tracking the center axis of the inner wobble, the sample disks were tested in relation to different maximum tolerance values and different minimum tolerance values.

The CNRs were tested when a maximum tolerance range E1 is: 0%≤E1<3%, 3%≤E1<5%, 5%≤E1<7%, 7%≤E1<10%, and 10%≤E1<13% of a maximum value. Also, the CNRs were tested when a minimum tolerance range E2 is: 0%≤E2<3%, 3%≤E2<5%, 5%≤E2<7%, 7%≤E2<10%, and 10%≤E2<13% of a minimum value. Each of CNRs in the following Tables 17 and 18 is an average CNR value of 10 sample disks within the respective tolerance range.

TABLE 17

| Maximum Tolerance Range | 0% ≤ E1 < 3% | 3% ≤ E1 < 5% | 5% ≤ E1 < 7% |
|---|---|---|---|
| CNR (dB) | 70 | 59 | 43 |
| Maximum Tolerance Range | 7% ≤ E1 < 10% | 10% ≤ E1 < 13% | |
| CNR (dB) | 28 | 20 | |

TABLE 18

| Minimum Tolerance Range | 0% ≤ E2 < 3% | 3% ≤ E2 < 5% | 5% ≤ E2 < 7% |
|---|---|---|---|
| CNR (dB) | 67 | 50 | 39 |
| Minimum Tolerance Range | 7% ≤ E2 < 10% | 10% ≤ E2 < 13% | |
| CNR (dB) | 23 | 18 | |

According to results of the tests, if the maximum tolerance range and the minimum tolerance range were less than 5%, quality of a recording layer could be classified as good and having stable recording characteristic.

EXAMPLE 4

Figure 16:
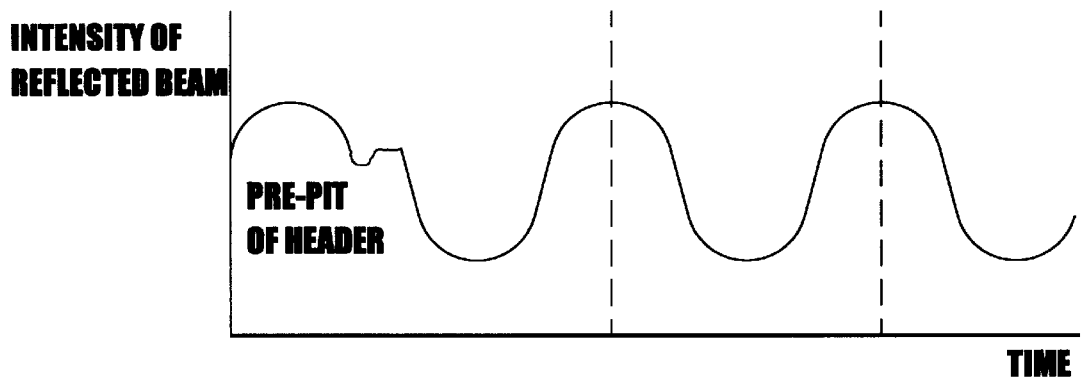
FIG. 16 is a waveform showing the ideal playback signal reproduced from a DVD-RAM when tracking the outer wobble center axis, center axis of a groove or center axis of a land.

A laser beam from a laser diode having a wavelength of 650 nm was used on DVD-RAMs. In the case where a DVD-RAM disk is in good condition, the laser beam spot tracks the center axis of a wobble or land, and a reproduction signal is output in the form of the wobble frequency, which corresponds to the intensity of the reflected light which changes regularly relative to time except for prepit portions of the header, as shown in FIG. 16. However, if there is defect (abnormality) in the quality of the recording layer or there are foreign substances in the recording layer, the reproduction signal has an abnormal waveform as shown in FIG. 17.

The quality of the DVD-RAM disk is determined based on a maximum tolerance range and a minimum tolerance range. That is, if the intensity of the reflected light from a disk under test is over the maximum tolerance range or under the minimum tolerance range, the disk under test is classified as being of poor quality (i.e., without commercial value). If the intensity of the reflected light from a disk under test is between the maximum tolerance range and the minimum tolerance range, the disk under test is classified as in good quality. The maximum tolerance range and the minimum tolerance range are determined by repetitive testing as described below.

Figure 17:
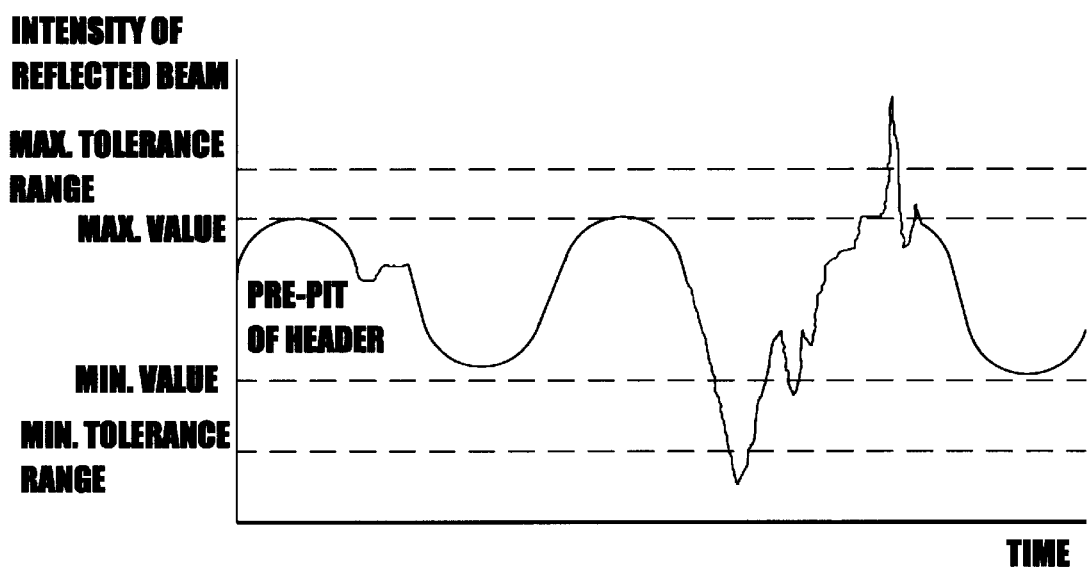
FIG. 17 is a waveform showing an actual playback signal reproduced from a DVD-RAM when tracking the outer wobble center axis, center axis of a groove or center axis of a land, and the recording layer is defective in its quality or includes foreign matter.

As shown in FIGS. 16 and 17, because the intensity of the reflected light at the prepit portions of the header is always between the maximum value and the minimum value of the wobble frequency, it does not affect the determination of quality of the optical disk under test.

CASE 1) As shown in FIG. 13, when the laser beam spot was controlled to output a reproduction signal by tracking the center axis of the outer wobble, the sample disks were tested in relation to different maximum tolerance values and different minimum tolerance values.

The CNRs were tested when a maximum tolerance range E1 is: 0%≦E1<3%, 3%≦E1<5%, 5%≦E1<7%, 7%≦E1<10%, and 10%≦E1<13% of a maximum value. Also, the CNRs were tested when a minimum tolerance range E2 is: 0%≦E2<3%, 3%≦E2<5%, 5%≦E2<7%, 7%≦E2<10%, 10%≦E2<13% of a maximum value. Each of the CNRs in the following Tables 19 and 20 is an average CNR value of 10 sample disks within the respective tolerance range.

TABLE 19

| Maximum Tolerance Range | 0% ≦ E1 < 3% | 3% ≦ E1 < 5% | 5% ≦ E1 < 7% |
|---|---|---|---|
| CNR (dB) | 62 | 50 | 38 |
| Maximum Tolerance Range | 7% ≦ E1 < 10% | 10% ≦ E1 < 13% | |
| CNR (dB) | 23 | 15 | |

TABLE 19

| Minimum Tolerance Range | 0% ≦ E2 < 3% | 3% ≦ E2 < 5% | 5% ≦ E2 < 7% |
|---|---|---|---|
| CNR (dB) | 61 | 48 | 30 |
| Minimum Tolerance Range | 7% ≦ E2 < 10% | 10% ≦ E2 < 13% | |
| CNR (dB) | 21 | 13 | |

According to results of the tests, if the maximum tolerance range and the minimum tolerance range were less than 5%, quality of a recording layer could be classified as good and having stable recording characteristic.

CASE 2) As shown in FIG. 14, when the laser beam spot was controlled to output a reproduction signal by tracking the center axis of the groove, DVD-RAM sample disks prepared as CASE 1 of Example 4 were tested in relation to different maximum tolerance values and different minimum tolerance values.

The CNRs were tested when a maximum tolerance range E1 is: 0%≦E1<3%, 3%≦E1<5%, 5%≦E1<7%, 7%≦E1<10%, and 10%≦E1<13% of a maximum value. Also, the CNRs were tested when a minimum tolerance range E2 is: 0% E2<3%, 3%≦E2<5%, 5%≦E2<7%, 7%≦E2<10%, and 10%≦E2<13% of a minimum value. Each of the CNRs in the following Tables 21 and 22 is an average CNR value of 10 sample disks within the respective tolerance range.

TABLE 21

| Maximum Tolerance Range | 0% ≦ E1 < 3% | 3% ≦ E1 < 5% | 5% ≦ E1 < 7% |
|---|---|---|---|
| CNR (dB) | 58 | 47 | 30 |
| Maximum Tolerance Range | 7% ≦ E1 < 10% | 10% ≦ E1 < 13% | |
| CNR (dB) | 21 | 13 | |

TABLE 19

| Minimum Tolerance Range | 0% ≦ E2 < 3% | 3% ≦ E2 < 5% | 5% ≦ E2 < 7% |
|---|---|---|---|
| CNR (dB) | 60 | 51 | 40 |
| Minimum Tolerance Range | 7% ≦ E2 < 10% | 10% ≦ E2 < 13% | |
| CNR (dB) | 29 | 15 | |

According to results of the tests, if the maximum tolerance range and the minimum tolerance range were less than 5%, quality of a recording layer could be classified as good and having stable recording characteristic.

Figure 18:
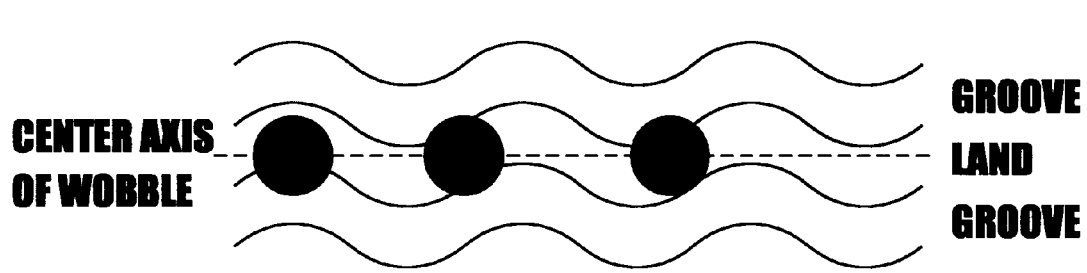
FIG. 18 shows the reflected spot when tracking the center axis of land of a DVD-RAM.

CASE 3) As shown in FIG. 18, when the laser beam spot was controlled to output a reproduction signal by tracking the center axis of the land, DVD-RAM sample disks prepared as CASE 1 of Example 4 were tested in relation to different maximum tolerance values and different minimum tolerance values.

The CNRs were tested when a maximum tolerance range E1 is: 0%≦E1<3%, 3%≦E1<5%, 5%≦E1<7%, 7%≦E1<10%, and 10%≦E1<13% of a maximum value. Also, the CNRs were tested when a minimum tolerance range E2 is: 0%≦E2<3%, 3%≦E2<5%, 5%≦E2<7%, 7%≦E2<10%, and 10%≦E2<13% of a minimum value. Each of the CNRs in the following Tables 23 and 24 is an average CNR value of 10 sample disks within each respective tolerance

TABLE 23

| Maximum Tolerance Range | 0% ≦ E1 < 3% | 3% ≦ E1 < 5% | 5% ≦ E1 < 7% |
|---|---|---|---|
| CNR (dB) | 74 | 59 | 45 |
| Maximum Tolerance Range | 7% ≦ E1 < 10% | 10% ≦ E1 < 13% | |
| CNR (dB) | 30 | 19 | |

TABLE 24

| Minimum Tolerance Range | 0% ≦ E2 < 3% | 3% ≦ E2 < 5% | 5% ≦ E2 < 7% |
|---|---|---|---|
| CNR (dB) | 68 | 53 | 42 |

TABLE 24-continued

| Minimum Tolerance Range | 7% ≤ E2 < 10% | 10% ≤ E2 < 13% |
|---|---|---|
| CNR (dB) | 33 | 20 |

According to results of the tests, if the maximum tolerance range and the minimum tolerance range were less than 5%, quality of a recording layer could be classified as good and having stable recording characteristic.

Meanwhile, because a DVD-RAM has pre-pits at predetermined portions, which is different from a CD-R, the DVD-RAM may have different tolerance values which correspond to different reflectivity of the prepits.

The present invention allows detection of defects on an optical disk via testing a reflected laser beam from a non-recorded disk. This allows testing of all disks without wasting sample disks, and allows for a more accurate and reliable quality test. Further, the present invention provides for testing of specified areas of an optical disk which may be in bad condition; thereby drastically reducing the time required for quality testing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of testing optical disk quality, comprising:
    reproducing an auxiliary signal from an optical disk, said auxiliary signal corresponding to a preformatted structure of said optical disk;
    storing a predetermined range corresponding to said optical disk;
    comparing said auxiliary signal to said predetermined range; and
    judging said disk quality of said optical disk based on said comparison.

2. The method of claim 1, wherein said reproducing step reproduces a wobble signal by tracking a center axis of a preformatted wobble in said optical disk.

3. The method of claim 2, wherein said preformatted wobble is an outer wobble.

4. The method of claim 2, wherein said preformatted wobble is an inner wobble.

5. The method of claim 1, wherein said reproducing step reproduces a wobble signal by tracking a center axis of a preformatted pregroove in said optical disk.

6. The method of claim 1, wherein said reproducing step reproduces a wobble signal by tracking a center axis of a preformatted groove in said optical disk.

7. The method of claim 1, wherein said reproducing step reproduces a wobble signal by tracking a center axis of a preformatted land in said optical disk.

8. The method of claim 1, wherein said reproducing step reproduces a wobble signal by tracking a center of a preformatted wobble in said optical disk.

9. The method of claim 1, wherein said reproducing step reproduces a wobble signal by tracking a center of one of a preformatted pregroove, groove and land in said optical disk.

10. The method of claim 1, wherein said judging step judges that said optical disk is usable if said comparing step indicates that said auxiliary signal falls within said predetermined range.

11. The method of claim 1, wherein said optical disk is a CD-R.

12. The method of claim 1, wherein said optical disk is a CD-RW.

13. The method of claim 1, where said optical disk is a DVD-R.

14. The method of claim 1, wherein said optical disk is a DVD-RAM.

15. The method of claim 1, wherein said reproducing step comprises:
    tracking a center axis of said preformatted structure;
    irradiating a laser beam on said optical disk based on said tracking;
    detecting a reflection of said laser beam from said optical disk; and
    generating said auxiliary signal based on said detection.

16. The method of claim 15, wherein said tracking step selectively tracks a center axis of one of a preformatted wobble, pregroove, groove, and land in said optical disk.

17. The method of claim 16, wherein said preformatted wobble is an outer wobble.

18. The method of claim 16, wherein said preformatted wobble is an inner wobble.

19. The method of claim 15, wherein said tracking step selectively tracks a center of one of a preformatted wobble, pregroove, groove, and land in said optical disk.

20. The method of claim 1, wherein said reproducing step comprises:
    tracking a center of said preformatted structure;
    irradiating a laser beam on said optical disk based on said tracking;
    detecting said laser beam reflected from said optical disk; and
    generating said auxiliary signal based on said detection.

21. A method of testing optical disk quality, comprising:
    reproducing an auxiliary signal from an optical disk, said auxiliary signal corresponding to a preformatted structure of said optical disk;
    storing predetermined tolerance ranges corresponding to a plurality of different optical disk types;
    selecting one of said predetermined tolerance ranges corresponding to a type of said optical disk;
    comparing said auxiliary signal to said selected predetermined tolerance range; and
    judging said disk quality of said optical disk based on said comparison.

22. A method of testing optical disk quality, comprising:
    reproducing an auxiliary signal from an optical disk, said auxiliary signal corresponding to a preformatted structure of said optical disk;
    determining whether a carrier-to-noise ratio of said auxiliary signal is greater than a predetermined threshold; and
    generating a good quality signal if said carrier-to-noise ratio is determined to be greater than said predetermined threshold.

23. An apparatus for testing optical disk quality, comprising:
    reproducing means for reproducing an auxiliary signal from an optical disk, said auxiliary signal corresponding to a preformatted structure of said optical disk; and
    a memory storing a predetermined range corresponding to said optical disk;

a processor comparing said auxiliary signal to said predetermined range, and judging said quality of said optical disk based on said comparison.

24. The apparatus of claim 23, wherein said reproducing means reproduces a wobble signal by tracking a center axis of a preformatted wobble in said optical disk.

25. The apparatus of claim 24, wherein said preformatted wobble is an outer wobble.

26. The apparatus of claim 24, wherein said preformatted wobble is an inner wobble.

27. The apparatus of claim 23, wherein said reproducing means reproduces a wobble signal by tracking a center axis of a preformatted pregroove in said optical disk.

28. The apparatus of claim 23, wherein said reproducing means reproduces a wobble signal by tracking a center axis of a preformatted groove in said optical disk.

29. The apparatus of claim 23, wherein said reproducing means reproduces a wobble signal by tracking a center axis of a preformatted land in said optical disk.

30. The apparatus of claim 23, wherein said reproducing means reproduces a wobble signal by tracking a center of a preformatted wobble in said optical disk.

31. The apparatus of claim 23, wherein said reproducing means reproduces a wobble signal by tracking a center of one of a preformatted pregroove, groove and land in said optical disk.

32. The apparatus of claim 23, wherein said processor judges that said optical disk is usable if said comparison indicates that said auxiliary signal falls within said predetermined tolerance range.

33. The apparatus of claim 23, wherein said optical disk is a CD-R.

34. The apparatus of claim 23, wherein said optical disk is a CD-RW.

35. The apparatus of claim 23, wherein said optical disk is a DVD-R.

36. The apparatus of claim 23, wherein said optical disk is a DVD-RAM.

37. The apparatus of claim 23, wherein said reproducing means comprises:

an optical pick-up irradiating said optical disk with a laser beam, and detecting a reflection of said laser beam from said optical disk;

tracking control means for controlling tracking of said optical pick-up such that said laser beam tracks a center axis of said preformatted structure; and a signal processor generating said auxiliary signal based on said detected reflection of said laser beam.

38. The apparatus of claim 37, wherein said tracking control means comprises:

a first tracking controller controlling tracking of said optical pick-up such that said laser beam tracks a center axis of one of a preformatted pregroove, groove, and land in said optical disk; and a second tracking controller controlling tracking of said optical pick-up such that said laser beam tracks a center axis of a preformatted wobble in said optical disk.

39. The apparatus of claim 38, wherein said second tracking controller selectively controls said laser beam to track one of an outer wobble and an inner wobble.

40. The apparatus of claim 38, further comprising:

a controller outputting a tracking control signal to said tracking control means indicating which of said first and second tracking controller should, control tracking.

41. The apparatus of claim 23, wherein said reproducing means comprises:

an optical pick-up irradiating said optical disk with a laser beam, and detecting said laser beam reflected from said optical disk;

tracking control means for controlling tracking of said optical pick-up such that said laser beam tracks a center of said preformatted structure; and a signal processor generating said auxiliary signal based on said detected reflection of said laser beam.

42. The apparatus of claim 41, wherein said tracking control means selectively controls tracking of said optical pick-up such that said laser beam tracks a center of one of a preformatted wobble, pregroove, groove, and land in said optical disk.

43. An apparatus for testing optical disk quality, comprising:

reproducing means for reproducing an auxiliary signal from an optical disk, said auxiliary signal corresponding to a preformatted structure of said optical disk;

a controller outputting a disk type signal indicating a type of said optical disk; and wherein
said determining means includes,
a memory storing predetermined tolerance ranges corresponding to a plurality of different optical disk types, and outputting one of said predetermined tolerance ranges based on said disk type signal, and
a processor comparing said auxiliary signal to said output predetermined tolerance range, and judging said quality of said optical disk based on said comparison.

44. An apparatus for testing optical disk quality, comprising:

reproducing means for reproducing an auxiliary signal from an optical disk, said auxiliary signal corresponding to a preformatted structure of said optical disk;

determining means for determining whether a carrier-to-noise ratio of said auxiliary signal is greater than a predetermined threshold, and for generating a good quality signal if said carrier-to-noise ratio is determined to be greater than said predetermined threshold.

* * * * *